April 21, 1953  G. F. KAROW  2,635,484
CRANK ASSEMBLY
Filed Sept. 20, 1948  4 Sheets-Sheet 2
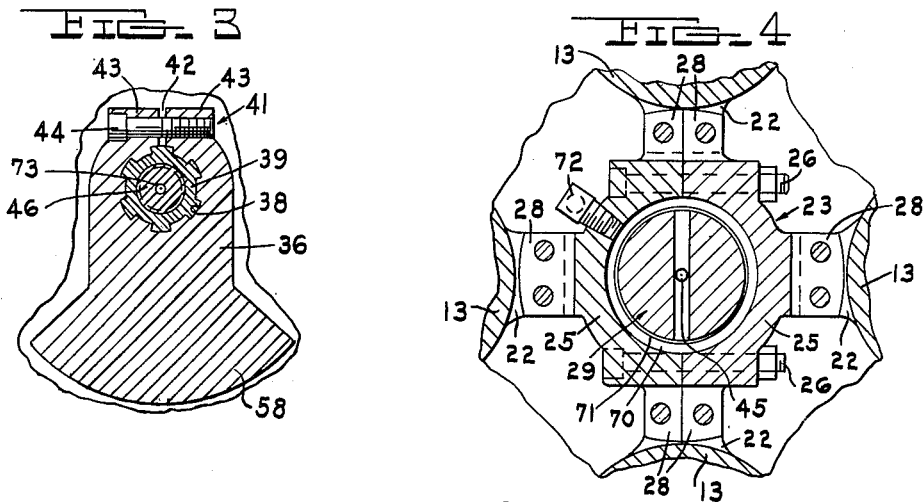
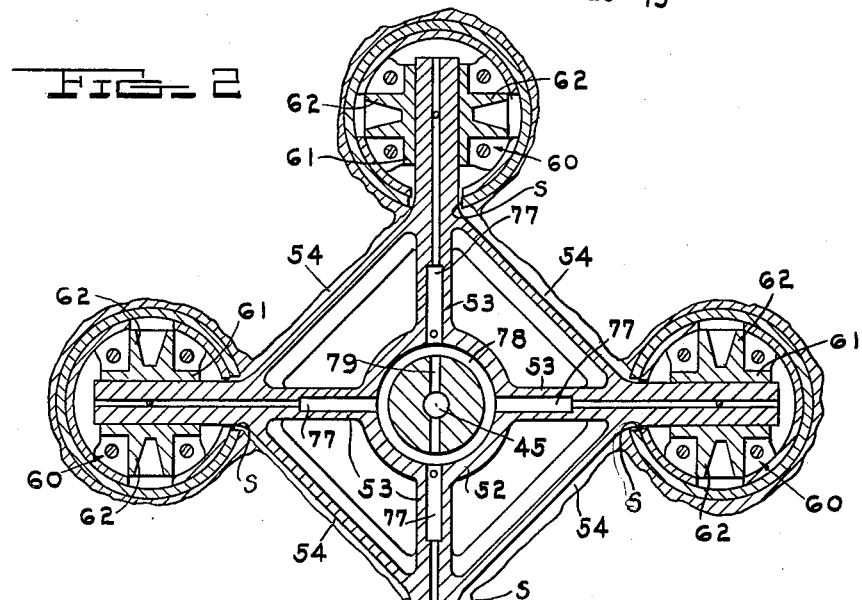
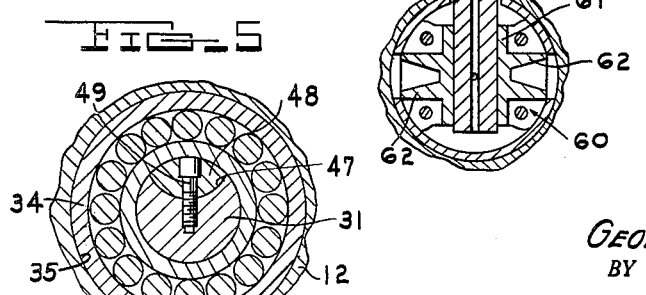
INVENTOR.
GEORGE F. KAROW
BY
ATTORNEYS April 21, 1953 G. F. KAROW 2,635,484
CRANK ASSEMBLY
Filed Sept. 20, 1948 4 Sheets-Sheet 3
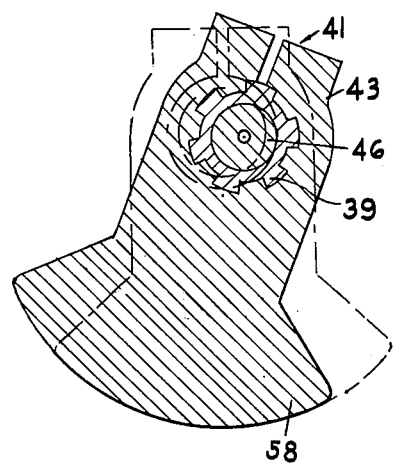
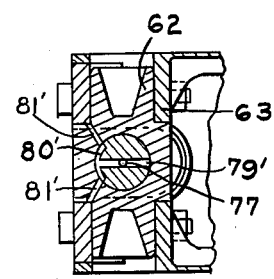
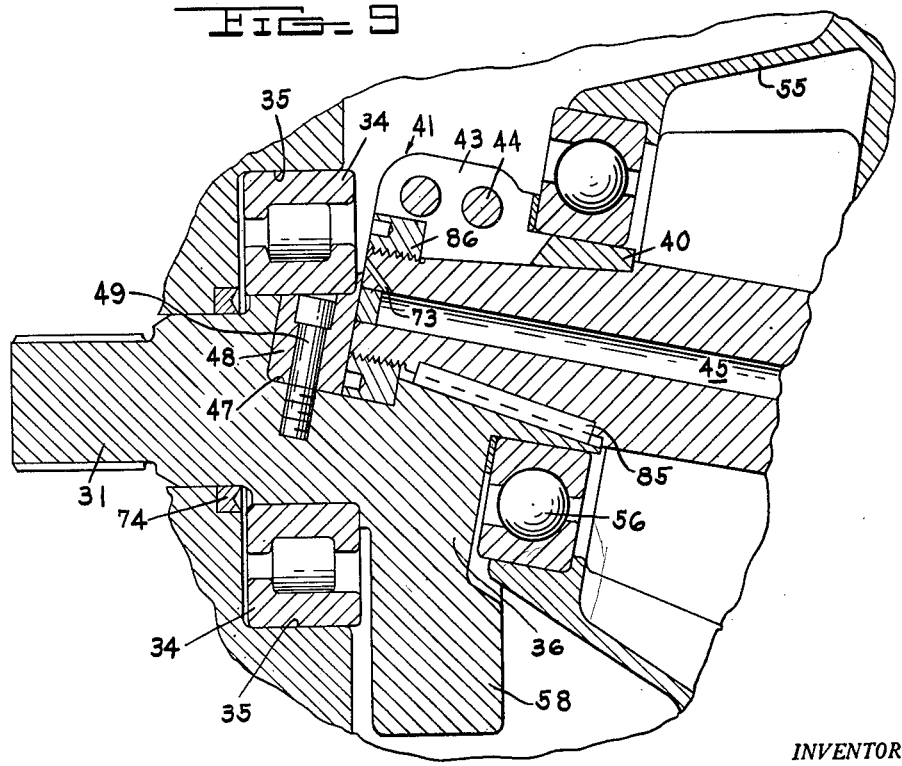
INVENTOR.
GEORGE F. KAROW
BY
ATTORNEYS

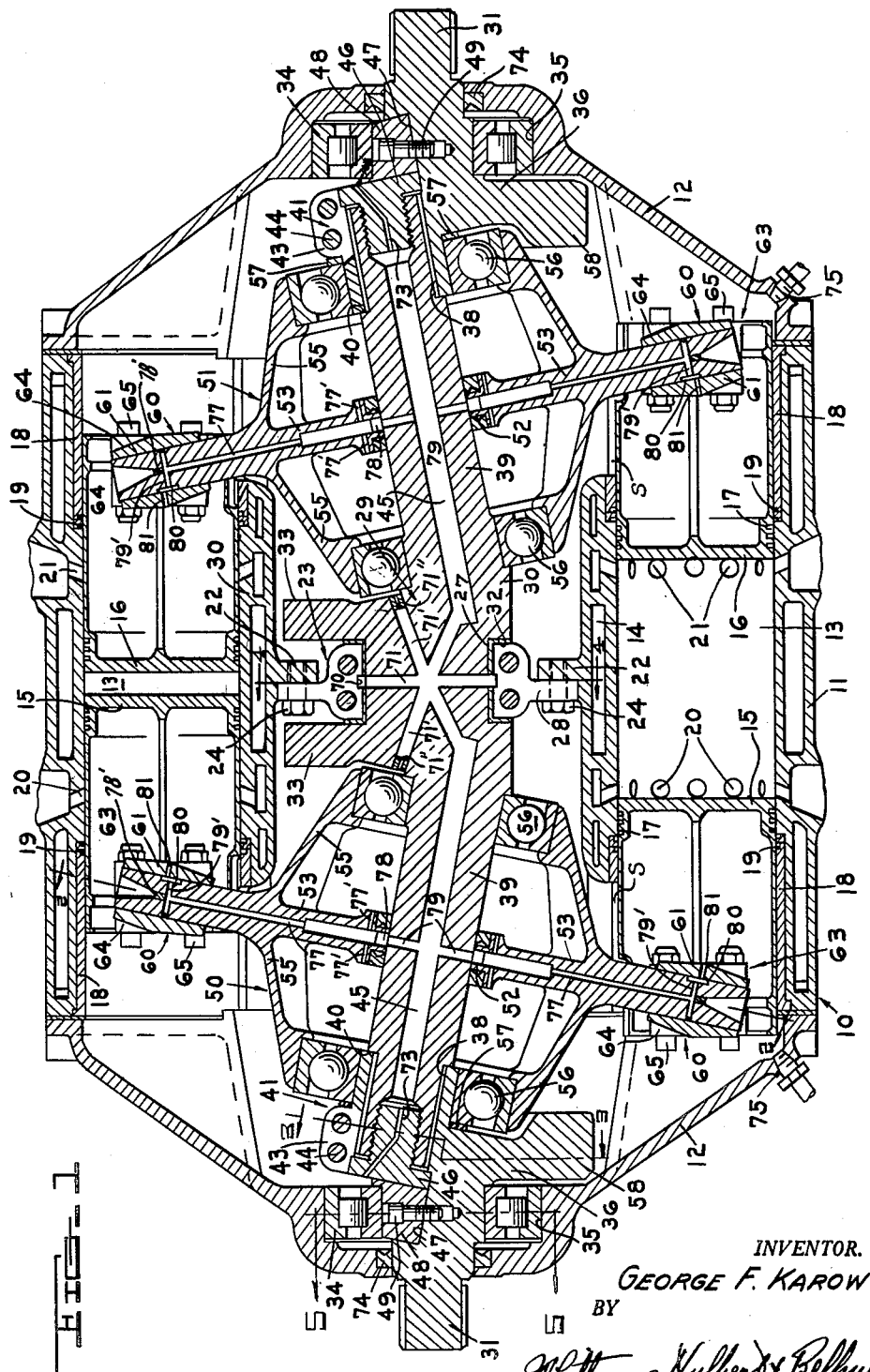

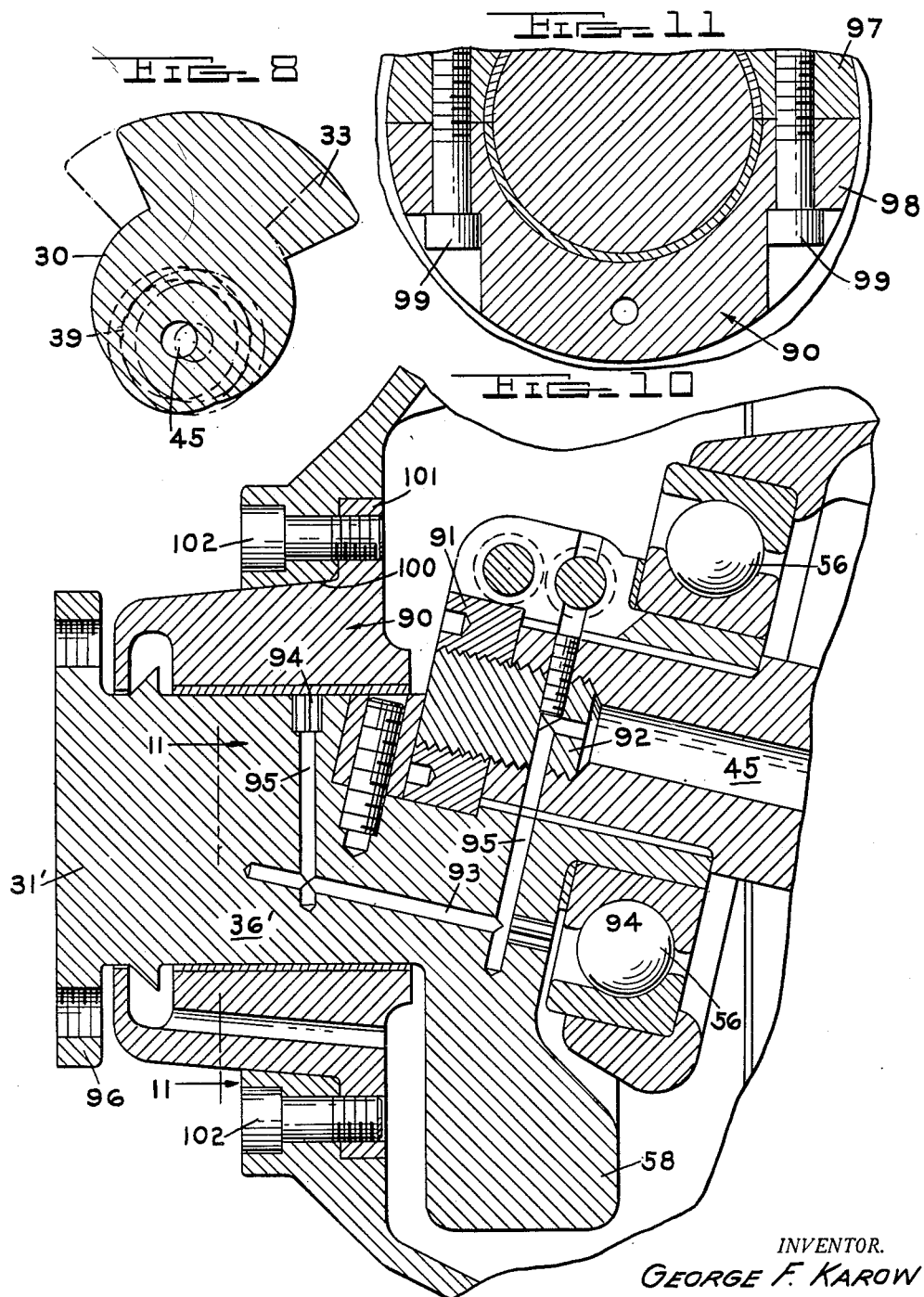

Patented Apr. 21, 1953

2,635,484

UNITED STATES PATENT OFFICE 2,635,484

CRANK ASSEMBLY

George F. Karow, Saginaw, Mich.

Application September 20, 1948, Serial No. 50,167

2 Claims. (Cl. 74—595)

This invention relates generally to motion transmitting mechanism and refers more particularly to improvements in mechanism for converting sliding motion to rotary motion or vice versa.

One of the objects of this invention is to provide motion transmitting mechanism composed of a relatively few simple parts capable of being inexpensively manufactured, assembled and installed in a compact case.

Another object of this invention is to provide motion transmitting mechanism having a shaft assembly provided with axially spaced aligned parts journalled on the case and connected by a shaft section inclined with respect to the aligned axes of the shaft parts.

Still another object of this invention is to connect the inclined shaft section to an element supported in the case for sliding movement in opposite directions along a path extending generally parallel to the aligned axis of the shafts by a member journalled on the inclined shaft part and having a radially outwardly extending portion connected to the element.

Still another object of this invention is to provide a shaft assembly comprising axially aligned end and intermediate shaft parts spaced axially from one another and connected together by inclined shaft sections, which in turn, are respectively connected to reciprocable elements for operating the latter upon rotation of the shaft assembly.

A further object of this invention is to provide a shaft assembly of the type set forth in the preceding paragraph wherein the plane through the axis of one of the inclined shafts coinciding with the axis of the aligned end and intermediate shafts is angularly displaced with respect to the corresponding plane of the other inclined shaft. This arrangement is especially advantageous when employed in connection with internal combustion engines of the opposed piston type wherein the opposed pistons are respectively connected to the inclined shaft sections, as it enables one piston to be operated in advance of the other.

A still further object of this invention is to provide a bearing for the intermediate shaft part, composed of separable sections designed to enable installing the shaft assembly endwise through one end of the case.

Another feature of this invention is to counterbalance the weight and forces of the assembly noted above with weights positioned to afford both static and dynamic balance.

A still further object of this invention is to provide motion transmitting mechanism of the type set forth above embodying relatively simple means for supplying lubricant to practically all friction surfaces and for spraying lubricant on the slidable element for cooling the latter.

In addition to the foregoing, this invention contemplates motion transmitting mechanism of the general type set forth adaptable to internal combustion engines of the multicylinder barrel type.

The foregoing as well as other objects will be made more apparent as this description proceeds, especially when considered in connection with the accompanying drawings, wherein:

Figure 1 is a longitudinal sectional view through an internal combustion engine embodying motion transferring mechanism constructed in accordance with this invention;

Figures 2, 3, 4 and 5 are sectional views taken respectively on the lines 2—2, 3—3, 4—4 and 5—5 of Figure 1;

Figure 6 is a sectional view showing the connection between one of the pistons and the associated operating arm;

Figures 7 and 8 are cross sectional views of a modified shaft assembly wherein one inclined section is angularly offset relative to the other;

Figure 9 is a fragmentary sectional view showing a further embodiment of the invention;

Figure 10 is a fragmentary sectional view showing still another modified shaft assembly; and Figure 11 is a sectional view on the line 11—11 of Figure 10.

The motion transferring mechanism embodying the features of this invention is shown, for the purpose of illustration, as applied to an internal combustion engine of the opposed piston barrel type. However, it will be apparent from the following description that the mechanism may be advantageously used in practically any installation where it is desired to translate reciprocating motion to rotary motion or vice versa.

Referring now more in detail to the drawings, it will be noted that the numeral 10 designates a case comprising an annular intermediate section 11 and end sections or walls 12 removably secured to opposite ends of the intermediate section by studs. Formed in the intermediate section 11 adjacent the periphery of the latter is a plurality of cylinders 13 spaced equal distances from each other circumferentially of the section 11 and having jacketed walls 14 for the circulation of a suitable cooling medium. Each cylinder is of sufficient length to slidably support two pistons 15 and 16 having sealing rings 17 of the expansion type supported in annular grooves formed in the head portions. In the present instance wear resisting sleeves 18 are secured in the outer end portions of each cylinder for engagement by the pistons and contracting sealing rings 19 are carried by the sleeves for contact with the skirt portions of the pistons. The expansion rings on the pistons and the contracting rings on the sleeves cooperate to prevent the escape of gases past the pistons from the chambers in the cylinders between opposed pairs of pistons. Also these rings prevent the escape of lubricant past the pistons into the chambers in the cylinders between opposed pairs of pistons. It will also be noted that each cylinder is formed with axially spaced intake and exhaust ports 20 and 21 positioned to be uncovered by the pistons when the latter are in their outermost positions shown at the bottom of Figure 1 of the drawings. In the outermost positions of the pistons the rings 17, of course, assume positions beyond the ports but at the inner sides of the rings 19 on the sleeves 18, so that the rings on the pistons and sleeves do not interfere with one another during normal operation of the pistons.

As shown in Figures 1 and 4 of the drawings, the inner walls of the cylinders 13 are formed with radially inwardly extending lugs 22 intermediate the ends thereof to which a bearing 23 is removably secured by studs 24. In detail, the bearing 23 is formed of two complementary halves 25 secured together by fastener elements 26 and having a lining 27 of bearing metal. Each bearing half is formed with outwardly extending ears 28 positioned to register with the lugs 22 and attachable to the latter by the studs 24.

Rotatably supported within the case by the bearing 23 is a shaft assembly 29 having an intermediate portion 30 and having parts 31 at opposite ends axially aligned with the intermediate portion. The intermediate portion 30 is journalled in the bearing 23 and is formed with an annular groove 32 for receiving the bearing 23. The shaft assembly and associated parts to be presently described are statically and dynamically balanced by counterweights 33 positioned on the intermediate portion of the shaft assembly at opposite sides of the bearing 23. The weights 33 are shown in the drawings as formed integral with the intermediate shaft section 30, although it will be understood that these weights may be formed separately and removably secured to the shaft if desired.

During assembly the shaft 29 is inserted into the case 10 through one end thereof prior to securing the end walls 12 in place. The intermediate portion 30 of the shaft is positioned in one-half of the bearing 23, and the complementary half of the bearing is then secured in place by the fastener elements 26. After the shaft assembly is installed within the case 10, the end walls 12 may be secured in place at opposite ends of the case to complete the assembly.

The opposite end parts 31 of the shaft assembly are respectively journalled on the end walls 12 of the case 10 by roller bearings 34, respectively secured within recesses 35 formed in the end walls 12. The inner ends of the shaft parts 31 are provided with enlargements 36 having bores 38 formed with their axes extending in the general direction of the common axis of the shaft parts 31, but inclined with respect to the latter.

The shafts 31 are respectively connected to the intermediate shaft portion 30 by shaft sections or parts 39 formed integral with the shaft portion 30 and having the axes thereof respectively aligned with the axes of the bores 38 in the enlargements 36. In fact the outer ends of the shaft sections 39 respectively extend into the bores 38, and are splined to engage corresponding splines formed in the inner surfaces of the bores 38. The end portions of the shaft sections 39 engaging in the bores 38 are reduced in diameter to form annular shoulders 40 on the shaft sections for abutting engagement with the shafts 31 at the inner ends of the bores 38. This arrangement establishes a fixed relationship between the shaft sections 39 and shaft parts 31 during assembly, and assures alignment of the shaft main bearings.

The outer ends of the shaft sections 39 are secured in the respective bores 38 by clamps 41 formed by slitting the walls of the bores at the outer ends of the latter as at 42 in Figure 3 of the drawings. It will also be noted from Figure 3 of the drawings that the enlargements 36 of the shafts 31 are formed with outwardly projecting ears 43 at opposite sides of the slot and studs 44 are provided for drawing the slit portions together to clamp the adjacent ends of the shaft sections 39 in the respective bores 38.

For reasons to be more fully hereinafter described, the shaft sections 39 are axially bored to form passages 45 enlarged at the outer ends of the shaft sections and closed by thrust screws 46 respectively threaded into the enlarged outer ends of the passages 45. The shafts 31 are recessed as at 47 to provide clearance for the screws 46, and in the interests of compactness, the recesses are formed in the shafts 31 in the planes of the bearings 36. The recesses 47 are normally filled by blocks 48 removably secured in the respective recesses by fastener elements 49. As shown in Figure 5 of the drawings, the outer surfaces of the filler blocks 48 form continuations of the cylindrical surfaces of the shafts 31 and provide a continuous bearing surface contact with the bearings 34. The blocks 48 enable reducing the lengths of the respective shaft parts 31 to a minimum, and this is important as it enables correspondingly reducing the overall length of the unit. Attention is also called to the fact at this time that end thrusts imparted to the shaft assembly are taken by the screws 46 and clamps 41.

The shaft sections 39 are respectively connected to the pistons 15 and 16 by "wobble plate" assemblies 50 and 51. Each assembly comprises an annular portion 52 rotatably supported on the adjacent shaft section 39 intermediate the ends thereof and having arms 53 extending radially outwardly from the annular portion. Adjacent arms 53 are connected together by braces 54 and the number of arms corresponds to the number of cylinders. Projecting laterally outwardly from opposite sides of the arms 53 of each assembly are hub sections 55 having provision at the outer ends for supporting ball bearings 56. The bearings 56 at the inner sides of the assemblies are mounted on the shaft sections 39 adjacent shoulders at opposite ends of the intermediate shaft part 30 and the bearings at the outer sides of the assemblies are respectively mounted on the shafts 31 in concentric relation to the axes of the bores 38. A spacing washer 57 is located between the axially outer side of each end bearing 56 and the adjacent side of the associated shaft 31 to provide a running clearance for these bearings. The axial distance between the bearings 56 of each "wobble plate" assembly assures an exceptionally stable construction capable of withstanding substantial loads without noticeable vibration. Vibration is further controlled by counterbalancing weights 58 on the shafts 31 in positions to cooperate with the weights 33 to provide dynamic balance of the assembly.

The outer ends of the arms on the assembly 50 are respectively connected to the pistons 15, and the outer ends of the arms on the assembly 51 are respectively connected to the pistons 16. The outer ends of the arms 53 project into the respective cylinders through open ended slots S formed in opposite ends of the cylinders. The construction is such as to enable the shaft assembly 29 including the bearings and parts 50 and 51 to be installed as a unit within the case 10. The arms 53 are connected to their respective pistons by couplings 60 secured to the skirt portions of the pistons. Each coupling comprises a bushing 61 positioned to slidably receive the end of the adjacent arm 53, and having trunnions 62 projecting outwardly from diametrically opposite sides thereof. The trunnions 62 of each coupling are journalled in bearings 63 carried by the skirt of the adjacent piston. One-half of the bearings are formed on the piston skirt and the other half are formed by caps 64 secured to the piston skirt at opposite sides of the bushing 61 by studs 65. Thus the couplings 60 permit a combined sliding and pivotal or swinging movement of the arms 53 relative to the pistons connected to the arms.

It follows from the foregoing that when the motion transferring mechanism described is applied to a barrel type internal combustion engine of the type illustrated, sliding movement of the pistons in opposite directions in their respective cylinders imparts a rotative movement to the shaft assembly 29. On the other hand, if the motion transferring mechanism previously described is applied to a pump, for example, rotation of the shaft assembly 29 by some type of power means imparts a reciprocable movement to the pistons.

It has previously been stated that the shaft sections 39 are formed with passages 45 therethrough. As shown in Figure 1 of the drawings, the adjacent ends of the passages 45 communicate with an annular recess 70 in the bearing 23 through a transversely extending passage 71 in the intermediate shaft part 30. The annular recess 70 communicates with a supply of lubricant under the pressure of a pump (not shown) through a connection 72, with the result that the bearing 23 is adequately lubricated. It will further be noted from Figure 1 of the drawings that the passage 71 is also connected to the inner ends of passages 71' having the outer ends communicating with the axially inner set of ball bearings 56 through restricted ports 71''. The construction is such that lubricant is, in effect, supplied to the bearings 56.

The outer ends of the passages 45 respectively communicate with the inner ends of reduced passages 73 formed in the plugs 46, and the outer ends of the passages 73 are directed to spray lubricant on the bearings 34. Thus the bearings 23, 34 and inner set of bearings 56 are continuously lubricated during operation of the engine or motion transferring mechanism. In this connection attention is called to the lubricant seals 74 carried by the end walls 12 of the case and respectively frictionally contacting the shafts 31 to prevent the escape of lubricant out of the case along the shafts 31. The excess lubricant drops to the bottom of the case, and is drained or conducted back to the reservoir through ports 75 in the case.

It will further be noted from Figure 1 of the drawings that each arm is axially drilled or otherwise fashioned with a passage 77 having the inner end communicating with an annular recess 78 in the annular portion 52, and having the outer ends extending through the corresponding ends of the arms. Suitable plugs 78' are provided for closing the outer ends of the passages 77. Lubricant from the passages 77 is supplied to both the inner and outer sets of bearings 56 through ports 77' formed in the annular portions 52 in circumferential spaced relationship. Inasmuch as the inner set of bearings 56 is supplied with lubricant by the passages 71', the inner ports 77' may be omitted, if desired. Lubricant from the passages 45 is supplied to the recesses 78 in the annular portions 52 through passages 79 extending transversely through the shaft sections 39.

Referring again to Figure 1 of the drawings, it will be seen that the outer ends of the passages 77 are connected to transverse passages 79' formed in the outer end portions of the arms 53 in positions to lubricate the bushings 61. Also longitudinal recesses 80 are formed in the outer ends of the arms 53 at the sides of the latter facing the piston heads, and these recesses communicate with the passages 79' to receive lubricant from the latter. This lubricant is introduced into the associated skirt portions of the pistons against the heads thereof through passages 81 formed in the sides of the bushings 61 adjacent the recesses 80. The length of the recesses 80 is such that the passages 81 are in constant communication with the recesses 80 throughout the reciprocable movement of the arms 53 in the respective bushings 61. Thus the pistons are continually sprayed with lubricant during operation of the mechanism and are prevented from overheating.

Referring now to Figure 6 of the drawings, it will be noted that the transverse passages 79' also supply lubricant to arcuate grooves 80' formed in the arms 53 opposite the grooves 80. The arcuate grooves 80' communicate with the bearings 63 for the trunnions 62 through passages 81' formed in the couplings. Thus the bearings 63 are adequately supplied with lubricant during operation of the mechanism.

When the above general construction is employed in connection with two-cycle internal combustion engines of the type illustrated in Figure 1 of the drawings, it is possible to obtain some degree of supercharging by angularly offsetting the plane through the axis of one shaft section 39 and including the axis of the aligned shafts 30 and 31 with respect to the corresponding plane of the other inclined shaft section. In order to secure some degree of supercharging, the above planes of the shaft sections 39 are angularly offset in the manner shown in Figures 7 and 8 of the drawings to retard the stroke of the intake port controlling piston with respect to the stroke of the piston controlling exhaust ports. Thus the exhaust ports are opened slightly in advance of the intake ports, and are closed some time in advance of the intake ports. The angular relationship between the above planes of the shaft sections 39, or in other words, the timing between the operation of the opposed pistons may be varied within limits to afford different operating characteristics. It may be pointed out that opening of the exhaust ports slightly in advance of the intake ports reduces the exhaust pressures before the intake port opens and thereby minimizes any tendency for the incoming fuel mixture to blow back when the intake ports are opened.

The embodiment of the invention shown in Figure 9 of the drawings differs from the above described construction in that the outer ends of the shaft sections 39 are tapered and the bores 38 in the adjacent shafts 31 are correspondingly tapered to receive the outer ends of the shaft sections. Thus the splines shown in Figure 1 of the drawings may be omitted, and simple keys 85 substituted therefor. In addition it will be noted that the outer ends of the shaft sections are threaded and collars 86 are respectively threaded on the outer ends of the shaft sections for securely holding the shafts 31 and sections 39 against relative axial movement.

The embodiment of the invention shown in Figures 10 and 11 of the drawings is similar to the first described form with few exceptions. Before describing these exceptions, it is pointed out that only one end of the shaft assembly is shown in Figure 10 and that the opposite end is preferably identical in construction. In detail the roller bearings 34 are omitted, and plain bearings 90 are substituted therefor. Also the flanges at the outer ends of the plugs 46 are omitted and thrust collars 91 are respectively threaded on the outer ends of the plugs 92 in positions to provide abutments for the outer ends of the shaft. In addition the arrangement for supplying lubricant to both the plain bearings 90 and ball bearings 56 is somewhat different. As shown passages 92' and 93 are drilled in the enlargements 36' of the shafts 31'. The inner ends of these passages communicate with one another and the outer ends of the passages are respectively located at the plain bearings 90 and ball bearings 56. Suitable plugs 94 are provided at the outer ends of the passages and restricted openings are formed in the plugs for supplying lubricant to the bearings. In the present instance lubricant is supplied to the passages 93 by passages 95 which connect the passages 93 to the passages 45 in the shaft sections 39. However, if desired, lubricant may be supplied directly from the source into the passages 92' by providing separate lubricant connections at the main bearings 90, as shown at 70 and 72 of the center main bearing.

Upon reference to Figure 10 of the drawings, it will be noted that the shaft section 31' has a radially outwardly extending flange 96 at the outer end which prohibits sleeving the bearing 90 over the shaft. Accordingly the bearing 90 is formed of two sections 97 and 98. These sections are clamped together on the shaft 31' by studs 99 and are positioned within a central opening 100 in the adjacent end of the housing. The bearing sections are also formed with radially outwardly projecting flanges 101 and the latter are clamped to the inner side of the housing by studs 102. It will be noted from Figure 10 of the drawings that the outer surface of the sectional bearing 90 is tapered and the adjacent surface of the housing is also tapered so that tightening of the studs 102 supplements the action of the studs 89 to clamp the bearing sections in position on the shaft section 31'.

What I claim as my invention is:

1. Motion transmitting mechanism comprising a case having means for supporting a bearing, a shaft rotatably supported in the bearing and having an enlargement at one side of the bearing, said enlargement having a bore extending in the general direction of the shaft and having the axis of the bore inclined with respect to the axis of the shaft, a tubular shaft having one end extending into the bore and having said end closed by a removable thrust element, said first named shaft being recessed in the plane of the bearing to provide clearance for the thrust element, and an insert removably secured to the shaft at the recess and having the outer surface forming a continuation of the bearing engaging surface on said first shaft.

2. Motion transmitting mechanism comprising a case having an end wall, a shaft supported on the end wall for rotation having a tubular part angularly disposed with respect to the axis of the shaft, said shaft having a recess therein at the outer end of the tubular part, a second shaft aligned with the axis of the tubular part and having the outer end extending into said part, means for securing the outer end of the second shaft to the first shaft, a shoulder on the second shaft engageable with the inner end of the tubular part, a thrust element carried by the second shaft and having a portion located within the recess in engagement with the outer end of the tubular part, a filler block secured within the recess at the outer side of the thrust element and cooperating with the remainder of the first shaft to provide a cylindrical surface, and a bearing for the first shaft engageable with said cylindrical surface.

GEORGE F. KAROW.

References Cited in the file of this patent

UNITED STATES PATENTS

| Number | Name | Date |
|---|---|---|
| 1,204,892 | Macomber | Nov. 14, 1916 |
| 1,316,679 | Brackett | Sept. 23, 1919 |
| 1,392,389 | Anderson | Oct. 4, 1921 |
| 1,543,113 | Lleo et al. | June 23, 1925 |
| 1,732,659 | Redrup | Oct. 22, 1929 |
| 1,799,167 | Hulsebos | Apr. 7, 1931 |
| 1,997,279 | Chilton | Apr. 9, 1935 |
| 2,081,157 | Swenson | May 25, 1937 |
| 2,104,391 | Redrup | Jan. 4, 1938 |
| 2,182,213 | Redrup | Dec. 5, 1939 |
| 2,215,086 | Schwager | Sept. 17, 1940 |
| 2,247,527 | Stinnes | July 1, 1941 |